2,866,840

POLYELECTROLYTES IN BATTERY PASTES

John F. Dittmann, Joplin, Mo., and Earl B. Cupp, Galena, Kans., assignors to The Eagle-Picher Company, Cincinnati, Ohio, a corporation of Ohio No Drawing. Application April 5, 1954
Serial No. 421,204

4 Claims. (Cl. 136—26)

This invention relates to an improvement in the manufacture of lead acid storage batteries of the general type which is in common use. Each cell of such a battery comprises a series of alternately arranged positive and negative plates, with separators in between, the assembly immersed in sulfuric acid as an electrolyte. The individual plates of the batteries are constituted by lead alloy grids to which electrolyte pervious, leady powders have been pasted.

It is conventional in manufacturing batteries of this type to mix a chosen combination of battery maker's lead oxides with dilute sulfuric acid, which converts some of the oxides present to lead sulfate and forms a paste, which is then applied to the grids and dried or otherwise processed. Usually, different oxide blends are used for positive and negative plates. After drying, the plates are formed by immersing them in sulfuric acid and passing an electrical current through them, whereby, for the most part, the positive plate is converted to lead peroxide and the negative plate to metallic lead.

It has also been proposed to make the plates by mixing battery maker's lead oxides, lead sulfates and water into a paste which is applied to the grids and dried. Such a process is disclosed in the patent to Chubb, No. 2,555,301, June 5, 1951.

In addition to various mixtures of battery maker's oxides it is conventional to employ bulking agents in the pastes. The bulking agents are utilized for the purpose of keeping the plates from being too dense, that is, in order to render the finished plates porous so that the sulfuric acid of the battery can get to the greatest possible area of active chemicals. The lead sulfate, which has always been an ingredient of the pastes used in the past, serves both as a binder and as a bulking agent. Other common bulking agents used to produce lead sulfate in the prepared paste are magnesium sulfate, ammonium sulfate and sulfuric acid. The presence of sulfates in battery pastes and in the raw or unformed plates, while necessary in the past, is undesirable because it retards the formation or conversion to lead peroxide of oxides in the positive plates because of the low electrical conductivity of the crystalline lead sulfate.

The object of the present invention is to provide a combination of battery maker's oxides and bulking agents which, when mixed with water, provides a sulfate-free paste which is easily applied to the grids, which can be dried without checking or cracking, and which yields strong finished plates of good electrochemical characteristics.

The type of battery maker's oxide which is preferably used in formulating the improved pastes of this invention is known as leady litharge, i. e. litharge containing substantially 5 to 30% metallic lead. The fineness of the grind is not critical but mixture ground to such fineness that 95% passes a 325 mesh sieve, the median radius being in the order of 1 to 3 microns, is satisfactory.

In place of the usual bulking agents we use a small percentage, such as .1 to 1.0%, of a material known as a polyelectrolyte, such as Krilium or Lustrex X-889. These polyelectrolytes consisting principally of polymethacrylates are relatively new commercial products; they are polymers, such as sodium polymethacrylate, which are water soluble but tend to adsorb on surfaces which have the capacity for ion exchange. These polymers are large molecules and are thought to form carbon linkage bridges between two mineral particles, thus binding them together to form an aggregate of particles which absorbs and holds a substantial quantity of water. This characteristic has led to the use of polyelectrolytes for conditioning clay soil by forming aggregates therein which are stabilized by the polyelectrolytes against the dispersing or slaking action of water. Polyelectrolytes other than sodium methacrylate, including various molecular modifications of sodium methacrylate, which have similar ionic behavior in water solution, may be used in place of it. Other examples of polyelectrolytes are: mixed calcium-sodium polymethacrylate or polyacrylonitrile, hydrolyzed sodium polyacrylonitrile, the calcium copolymer of maleic acid and polyvinyl acetate, the copolymer of styrene and N-methyl 2-vinyl-pyridine methosulfate.

With the leady litharge, a hydrophilic adhesive such as methylcellulose or carboxymethylcellulose preferably is incorporated. Substantially .2 to 1% of a material of this type is used, the percentage being based on the weight of the dry mix. Both methylcellulose and carboxymethylcellulose tend to take up many times their weight of water to form a strong, stable, adhesive gel which swells the volume and lowers the density of the paste and also renders it more absorbent to electrolyte. The amount of such an adhesive used governs the amount of water required to prepare a workable paste and in so doing controls also the bulk density of the paste and the lead content per unit volume of the electrodes prepared from such a paste.

The combination of a leady litharge, polyelectrolyte and water, with or without the methylcellulose or carboxymethylcellulose, produces a paste which is very cohesive and easily handled, which cuts off clean when applied to the grids, which can be dried or processed without the usual checking or cracking, and which produces strong cured plates. If the methylcellulose or carboxymethylcellulose is also included, the paste has a particular jellylike quality, a cohesiveness and shortness which makes it particularly easy to handle and to apply to the grids. In either case, the cured plates are more flexible, less fragile, and particularly less brittle, than the cured plates produced from lead sulfate pastes. The plates of this invention also clear rapidly during the forming operation and the lead peroxide content develops more rapidly than usual in the positive plate, due to the absence of crystalline lead sulfate.

The materials specified may be combined with an appropriate quantity of water to form pastes having a substantial range of specific gravities, such as 55 to 80 grams per cubic inch of paste. A density of 62 to 70 grams per cubic inch is recommended for the positive paste depending on plant conditions and 65 to 72 grams for the negative paste. Despite the variations in density of the plates and despite the absence of sulfates to provide increasing porosity in the forming process, the plates of this invention form, discharge and recharge at least as well as plates which are fabricated by methods heretofore known. The plates absorb water or electrolyte readily and no adverse physical or electrical effects accompany the formation of lead sulfate which is incident to discharge of the battery, in spite of the fact that, in use, the chemical character of the particles which constitute the plate is continuously changing. In other words, neither the presence of the sulfuric acid electrolyte nor the electrochemical reactions which attend the charging and discharging operations impairs the physical stability of the plates or their electrical efficiency.

The following are examples of the pastes of this invention:

Example 1

| | Percent |
|---|---|
| Leady litharge containing 25% free lead | 99.7 |
| Sodium methacrylate | 0.2 |
| Methylcellulose | 0.1 |

A paste is made by mixing 10 lbs. of this formula with 810 cc. of water producing an apparent paste density of 70 gm./cu. in. with a normal workable consistency.

Example 2

| | Percent |
|---|---|
| Leady litharge containing 30% free lead | 99.6 |
| Sodium methacrylate | 0.2 |
| Carboxymethylcellulose | 0.2 |

A paste is made by mixing 10 lbs. of this formula with 970 cc. of water producing an apparent paste density of 62 gm./cu. in. with a normal workable consistency.

Example 3

| | Percent |
|---|---|
| Leady litharge containing 20% free lead | 99.7 |
| Sodium methacrylate | 0.3 |

A paste is made by mixing 10 lbs. of this formula with 890 cc. of water producing an apparent paste density of 66 gm./cu. in. with a normal workable consistency.

Example 4

| | Percent |
|---|---|
| Leady litharge containing 25% free lead | 99.6 |
| Methylcellulose | 0.4 |

A paste is made by mixing 10 lbs. of this formula with 890 cc. of water producing an apparent paste density of 66 gm./cu. in. with a normal workable consistency.

Example 5

| | Percent |
|---|---|
| Leady litharge containing 30% free lead | 98.92 |
| Carbon black | 0.16 |
| Barium sulfate | 0.37 |
| Organic expander | 0.15 |
| Sodium methacrylate | 0.30 |
| Carboxymethyl cellulose | 0.10 |

A paste is made by mixing 10 lbs. of this formula with 810 cc. of water producing an apparent paste density of 70 gm./cu. in. with a normal workable consistency.

In each case, the leady litharge, polyelectrolyte and hydrophilic adhesive are mixed together in dry pulverized form to provide a mixture of battery maker's lead oxide suitable for shipment to the battery manufacturer. This dry powder is mixed with water by the battery maker for a time sufficient to produce a thick paste, for instance, 5 to 30 minutes, depending upon the efficiency of the mixing equipment. The paste is then applied to the grids by conventional methods, after which the plates are cured by methods which are also conventional. The resulting cured plates are free from checks and cracks and are stronger and more flexible than conventional plates, which facilitates their handling in the subsequent manufacturing operations and provides an ultimate battery of superior ruggedness.

It is to be understood that the battery maker's lead oxides which may be used in combination with the polyelectrolytes and/or hydrophilic adhesives herein disclosed may be more highly oxidized than the leady litharge which is specifically disclosed, i. e., the litharge may be relatively pure and/or a higher oxide of lead, such as red lead may be included in the mixes if desired. However, from the point of view of the overall efficiency of manufacturing battery maker's oxides and batteries, the use of the leady litharge is preferred and recommended. In any case, the paste is constituted by mixing water with a mixture of battery maker's oxides which is devoid of the sulfuric acid and sulfates which have always been used, and regarded as necessary, in the past.

Having described our invention, we desire to be limited only by the following claims:

1. A lead oxide mixture adapted to form a cohesive paste with water for use in the preparation of lead-acid battery plates, comprising leady litharge containing 5 to 30% free lead and .1 to 1% sodium polymethacrylate.

2. A lead oxide mixture adapted to form a cohesive paste with water for use in the preparation of lead-acid battery plates, comprising leady litharge containing 5 to 30% free lead and .1 to 1% sodium polymethacrylate and .2 to 1% of hydrophilic adhesive of the class consisting of methylcellulose and carboxymethylcellulose.

3. A lead oxide mixture adapted to form a cohesive paste with water for use in the preparation of lead-acid battery plates, comprising lead oxide and .1 to 1% sodium polymethacrylate.

4. A lead oxide mixture adapted to form a cohesive paste with water for use in the preparation of lead-acid battery plates, comprising lead oxide, .1 to 1% sodium polymethacrylate, and .2 to 1% of hydrophilic adhesive of the class consisting of methylcellulose and carboxymethylcellulose.

References Cited in the file of this patent

UNITED STATES PATENTS

| 1,929,357 | Johnstone | Oct. 3, 1933 |
|---|---|---|
| 2,340,110 | D'Alelio | Jan. 25, 1944 |
| 2,373,548 | D'Alelio | Apr. 10, 1945 |
| 2,674,642 | Agruss | Apr. 6, 1954 |
| 2,677,713 | Weil et al. | May 4, 1954 |

OTHER REFERENCES

Storage Batteries, Vinal, 2nd edition, 1930, pages 25–46.

"The Electrochemical Society," Addition Agents for Negative Plate, by Ritchie, 1947, Reprint 92-34, pages 416–443.